United States Patent
Ruuskanen et al.

(10) Patent No.: US 11,561,088 B2
(45) Date of Patent: Jan. 24, 2023

(54) MODELING THE TOPOGRAPHY OF A THREE-DIMENSIONAL SURFACE

(71) Applicant: LaDiMo Oy, Espoo (FI)

(72) Inventors: Sami Ruuskanen, Espoo (FI); Jorma Palmén, Helsinki (FI); Oona Räisänen, Espoo (FI); Tatu Tolonen, Espoo (FI)

(73) Assignee: Pibond Oy, Espoo (FI)

( * ) Notice: Subject to any disclaimer, the term of this patent is extended or adjusted under 35 U.S.C. 154(b) by 0 days.

(21) Appl. No.: 16/972,994

(22) PCT Filed: Jun. 7, 2019

(86) PCT No.: PCT/FI2019/050446
§ 371 (c)(1),
(2) Date: Dec. 7, 2020

(87) PCT Pub. No.: WO2019/234307
PCT Pub. Date: Dec. 12, 2019

(65) Prior Publication Data
US 2021/0247181 A1    Aug. 12, 2021

(30) Foreign Application Priority Data
Jun. 7, 2018  (FI) .................................. 20185522

(51) Int. Cl.
*G06T 7/521*    (2017.01)
*G01B 11/25*    (2006.01)
(Continued)

(52) U.S. Cl.
CPC .......... *G01B 11/2513* (2013.01); *G01B 11/03* (2013.01); *G01B 11/2545* (2013.01);
(Continued)

(58) Field of Classification Search
CPC . G01B 11/2513; G01B 11/03; G01B 11/2545; G06T 7/521; G06T 2207/10028; G06T 7/593
(Continued)

(56) References Cited

U.S. PATENT DOCUMENTS

| 6,711,293 B1 | 3/2004 | Lowe |
| 2007/0165243 A1 | 7/2007 | Cheol-Gwon et al. |

(Continued)

FOREIGN PATENT DOCUMENTS

| CN | 101373135 A | 2/2009 |
| CN | 101627280 A | 1/2010 |

(Continued)

OTHER PUBLICATIONS

International Preliminary Report on Patentability for PCT/FI2019/050446 dated Sep. 15, 2020.

(Continued)

*Primary Examiner* — James T Boylan
(74) *Attorney, Agent, or Firm* — Christopher M. Scherer; DeWitt LLP

(57) ABSTRACT

According to an aspect, there is provided a method comprising controlling a structural light source of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model; recording a first image of the surface comprising the diffraction pattern with a first camera and a second image of the surface comprising the diffraction pattern with a second camera substantially simultaneously; determining a point cloud comprising primary points from the diffraction pattern visible in the first image; identifying the corresponding (Continued)

primary points from the second image; and using each primary point of the point cloud in the first and second images as an initial point for search spaces for secondary points in the first and second images.

14 Claims, 9 Drawing Sheets

(51) Int. Cl.
  *G06T 7/593* (2017.01)
  *G01B 11/03* (2006.01)
  *H04N 13/00* (2018.01)
(52) U.S. Cl.
  CPC .............. *G06T 7/521* (2017.01); *G06T 7/593* (2017.01); *G06T 2207/10028* (2013.01); *H04N 2013/0081* (2013.01)
(58) Field of Classification Search
  USPC ......................................................... 356/603
  See application file for complete search history.

(56) References Cited

U.S. PATENT DOCUMENTS

| | | |
|---|---|---|
| 2007/0216894 A1 | 9/2007 | Garcia et al. |
| 2013/0038490 A1 | 2/2013 | Garcia |
| 2014/0037189 A1* | 2/2014 | Ziegler ................... G06T 17/00 382/154 |
| 2015/0339541 A1* | 11/2015 | Fan ........................ G06K 9/623 382/154 |
| 2016/0238377 A1* | 8/2016 | Palmen .................. G01B 11/22 |
| 2017/0032530 A1 | 2/2017 | Hisayoshi |
| 2017/0067734 A1 | 3/2017 | Heidemann et al. |
| 2018/0096463 A1 | 4/2018 | Changil et al. |
| 2018/0101932 A1* | 4/2018 | Kwon ................... G06T 3/0068 |

FOREIGN PATENT DOCUMENTS

| | | |
|---|---|---|
| CN | 105091748 A | 11/2015 |
| CN | 105229412 A | 1/2016 |
| CN | 106802138 | 6/2017 |
| CN | 106840037 A | 6/2017 |
| EP | 3481062 | 5/2019 |
| JP | 2013257162 | 12/2013 |
| JP | 2016537612 | 12/2016 |
| WO | 2013184340 | 12/2013 |
| WO | 2015044524 | 4/2015 |
| WO | 2016040229 | 3/2016 |
| WO | 2016150527 | 9/2016 |
| WO | 2017180543 | 10/2017 |
| WO | 2018001252 | 1/2018 |

OTHER PUBLICATIONS

Office Action for CN201980037971.4, dated Jul. 22, 2021.
Search Report for FI20185522, dated Jan. 11, 2019.
Extended European Search Report for EP19814728.2, dated Feb 9, 2022.
Notice of Refusal for JP2021-517916 dated Nov. 1, 2022.

* cited by examiner

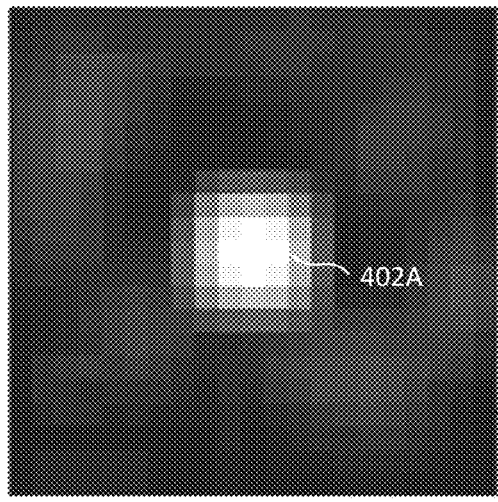
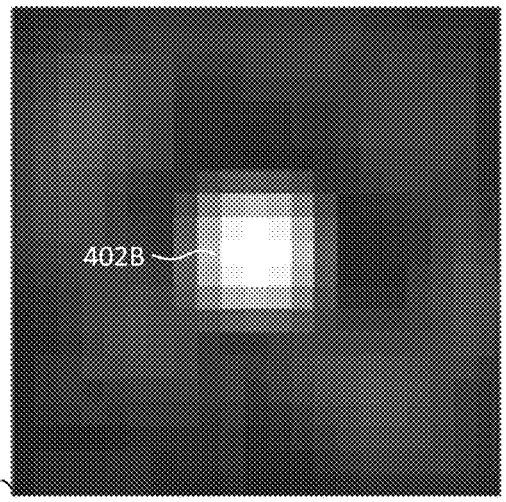
FIG. 4B
FIG. 4C
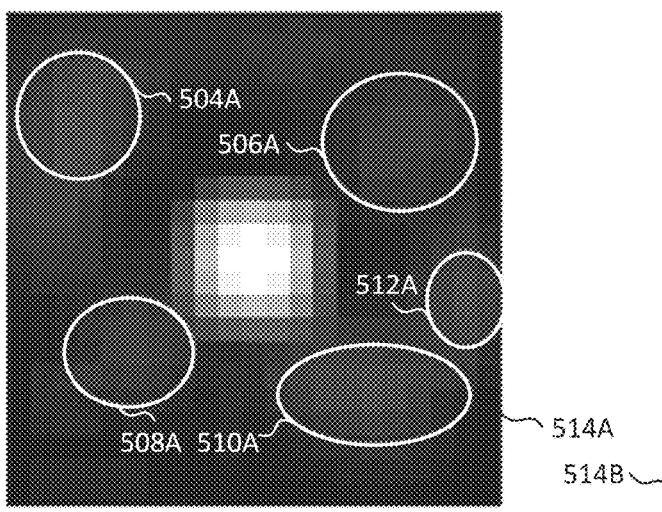
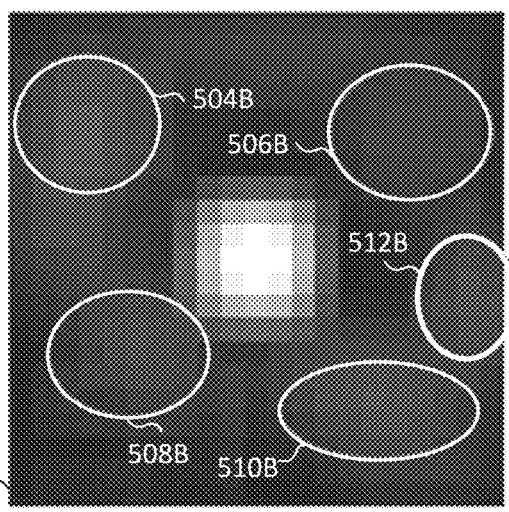
FIG. 5A
FIG. 5B

MODELING THE TOPOGRAPHY OF A THREE-DIMENSIONAL SURFACE

CROSS-REFERENCE TO RELATED APPLICATIONS

The present application is the U.S. national stage application of International Application No. PCT/FI2019/050446, filed Jun. 7, 2019, which international application was published on Dec. 12, 2019, as International Publication No. WO02019/234307. The International Application claims priority to Finnish Patent Application No. 20185522, filed Jun. 7, 2018, the contents of which are incorporated herein by reference in their entireties.

FIELD OF THE INVENTION

The invention relates to stereophotogrammetry.

BACKGROUND OF THE INVENTION

Photogrammetry makes use of mapping or modeling based on photographs taken of an object of interest. There are numerous applications in which, for example, three-dimensional imaging conducted by means of machine vision is very useful. In general, these systems may include, for example, a camera, a lighting device and a control system managing the equipment. In stereophotogrammetry, a three-dimensional object is modeled by taking two or more photographs of an object from different camera positions and identifying the common points in each photograph.

The challenge in photogrammetry and stereophotogrammetry is to be able to model a three-dimensional object quickly, for example, in real-time or near real-time, and do this very accurately.

SUMMARY OF THE INVENTION

According to a first aspect of the invention, there is provided a method comprising controlling a structural light source of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model. The method further comprises recording a first image of the surface comprising the diffraction pattern with a first camera of the modelling arrangement and a second image of the surface comprising the diffraction pattern with a second camera of the modelling arrangement substantially simultaneously, the first camera and the second camera being calibrated and their positions relative to each other being known. The method further comprises determining a point cloud comprising primary points from the diffraction pattern visible in the first and second images, and using each primary point of the point cloud in the first and second images as an initial point for search spaces for secondary points in the first and second images.

According to a second aspect of the invention, there is provided a method comprising controlling a structural light source of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model. The method further comprises recording a first image of the surface comprising the diffraction pattern with a first camera of the modelling arrangement and a second image of the surface comprising the diffraction pattern with a second camera of the modelling arrangement substantially simultaneously, the first camera and the second camera being calibrated and their positions relative to each other being known. The method further comprises determining a point cloud comprising primary points from the diffraction pattern visible in the first image, identifying the corresponding primary points from the second image, and using each primary point of the point cloud in the first and second images as an initial point for search spaces for secondary points in the first and second images.

In an implementation form of the first aspect or the second aspect, the method further comprises forming partial image pairs of the first and second images by dividing the first image and the second image to a set of partial images, each partial image pair comprising a partial image of the first image and a corresponding partial image of the second image, and wherein each partial image of the first image and the second image comprise the same single primary point of the point cloud; identifying corresponding secondary points in the partial image pairs, each secondary point having x and y image coordinates, and calculating X, Y and Z coordinates in an external coordinate system for each secondary point based on the x and y image coordinates of the secondary point and the camera positions.

In an implementation form of the first aspect or the second aspect, the method further comprises forming partial image pairs of the first and second images by dividing the first image and the second image to a set of partial images, each partial image pair comprising a partial image of the first image and a corresponding partial image of the second image, and wherein each partial image pair of the first image and the second image comprises a closed area defined by at least three primary points; identifying corresponding secondary points within the closed area in the partial image pairs, each secondary point having x and y image coordinates, and calculating X, Y and Z coordinates in an external coordinate system for each secondary point based on the x and y image coordinates of the secondary point and the camera positions.

In further implementation form of the first aspect or the second aspect, the method further comprises excluding the at least three primary points from the partial image pairs; determining a first maximum intensity in the partial image of the first image and a second maximum intensity in the partial image of the second image from which the at least three primary points have been excluded; normalizing an intensity of each pixel in the partial image of the first image based on the first maximum intensity; and normalizing an intensity of each pixel in the partial image of the second image based on the second maximum intensity.

In further implementation form of the first aspect or the second aspect, the method further comprises dividing each partial image into sub-blocks; and identifying corresponding secondary points in the sub-blocks.

In further implementation form of the first aspect or the second aspect, identifying corresponding secondary points in the partial image pairs comprises: searching a secondary point in the partial image of the second image, the secondary point corresponding to a secondary point in the corresponding partial image of the first image, in a search area along the corresponding epipolar line in the partial image of the second image having substantially the same distance along the epipolar line from the primary point in the partial image of the second image than a distance between the secondary point in the partial image of the first image and the primary point in the partial image of the first image.

In further implementation form of the first aspect or the second aspect, identifying corresponding secondary points in the partial image pairs comprises: searching a secondary point in the partial image of the second image, the secondary point corresponding to a secondary point in the corresponding partial image of the first image, in a search area in the partial image of the second image having substantially the same distance from the primary point in the partial image of the second image than a distance between the secondary point in the partial image of the first image and the primary point in the partial image of the first image.

According to a third aspect of the invention, there is provided a modelling system comprising a modelling arrangement comprising a structural light source configured to produce a diffraction pattern of a known geometry on a surface to be modeled, the diffraction pattern accurately complying with a mathematical-physical model and wherein beam output angles of the diffraction pattern are accurately known based on the mathematical-physical model; a first camera configured to photograph the surface to be modeled at wavelengths emitted by the light source; and a second camera configured to photograph the surface to be modeled at wavelengths emitted by the light source. The modeling arrangement is calibrated so that relative orientations of the optical axis of the first camera and the second camera and the diffraction axis are known, and wherein the position, distance and orientation of the output point of the structural light source to the first camera and the second camera are known. The modelling system further comprises a control system connected to the modelling arrangement and being configured to control the structural light source to produce the diffraction pattern of a known geometry on the surface to be modeled, record a first image of the surface comprising the diffraction pattern with the first camera and a second image of the surface comprising the diffraction pattern with the second camera substantially simultaneously; determine a point cloud comprising primary points from the diffraction pattern visible in the first and second images; and use each primary point of the point cloud in the first and second images as initial points for search spaces for secondary points in the first and second images.

According to a fourth aspect of the invention, there is provided a modelling system comprising a modelling arrangement comprising a structural light source configured to produce a diffraction pattern of a known geometry on a surface to be modeled, the diffraction pattern accurately complying with a mathematical-physical model and wherein beam output angles of the diffraction pattern are accurately known based on the mathematical-physical model; a first camera configured to photograph the surface to be modeled at wavelengths emitted by the light source; and a second camera configured to photograph the surface to be modeled at wavelengths emitted by the light source. The modeling arrangement is calibrated so that relative orientations of the optical axis of the first camera and the second camera and the diffraction axis are known, and wherein the position, distance and orientation of the output point of the structural light source to the first camera and the second camera are known. The modelling system further comprises a control system connected to the modelling arrangement and being configured to control the structural light source to produce the diffraction pattern of a known geometry on the surface to be modeled, record a first image of the surface comprising the diffraction pattern with the first camera and a second image of the surface comprising the diffraction pattern with the second camera substantially simultaneously; determine a point cloud comprising primary points from the diffraction pattern visible in the first image; identify the corresponding primary points from the second image; and use each primary point of the point cloud in the first and second images as initial points for search spaces for secondary points in the first and second images.

In an implementation form of the third aspect or the fourth aspect, the control system connected to the modelling arrangement is further configured to form partial image pairs of the first and second images by dividing the first image and the second image to a set of partial images, each partial image pair comprising a partial image of the first image and a corresponding partial image of the second image, and wherein each partial image of the first image and the second image comprise the same single primary point of the point cloud; identify corresponding secondary points in the partial image pairs, each secondary point having x and y image coordinates; and calculate X, Y and Z coordinates in an external coordinate system for each secondary point based on the x and y image coordinates of the secondary point and the camera positions.

In an implementation form of the third aspect or the fourth aspect, the control system is further configured form partial image pairs of the first and second images by dividing the first image and the second image to a set of partial images, each partial image pair comprising a partial image of the first image and a corresponding partial image of the second image, and wherein each partial image pair of the first image and the second image comprises a closed area defined by at least three primary points; identify corresponding secondary points within the closed area in the partial image pairs, each secondary point having x and y image coordinates, and calculate X, Y and Z coordinates in an external coordinate system for each secondary point based on the x and y image coordinates.

In further implementation form of the third aspect or the fourth aspect, the control system is further configured exclude the at least three primary points from the partial image pairs; determine a first maximum intensity in the partial image of the first image and a second maximum intensity in the partial image of the second image from which the at least three primary points have been excluded; normalize an intensity of each pixel in the partial image of the first image based on the first maximum intensity; and normalize an intensity of each pixel in the partial image of the second image based on the second maximum intensity.

In a further implementation form of the third aspect or the fourth aspect, the control system is configured to divide each partial image into sub-blocks, and identify corresponding secondary points in the sub-blocks.

In a further implementation form of the third aspect or the fourth aspect, the control system is configured to search a secondary point in the partial image of the second image, the secondary point corresponding to a secondary point in a corresponding partial image of the first image, in a search area along the corresponding epipolar line in the partial image of the second image having substantially the same distance along the epipolar line from the primary point in the partial image of the second image than a distance between the secondary point in the partial image of the first image and the primary point in the partial image of the first image.

In a further implementation form of the third aspect or the fourth aspect, the control system is configured to search a secondary point in the partial image of the second image, the secondary point corresponding to a secondary point in a corresponding partial image of the first image, in a search area in the partial image of the second image having substantially the same distance from the primary point in the partial image of the second image than a distance between the secondary point in the partial image of the first image and the primary point in the partial image of the first image.

According to a fifth aspect, there is provided an apparatus comprising at least one processor and at least one memory connected to the at least one processor. The at least one memory stores program instructions that, when executed by the at least one processor, cause the apparatus to control a structural light source of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model; record a first image of the surface comprising the diffraction pattern with a first camera of the modelling arrangement and a second image of the surface comprising the diffraction pattern with a second camera of the modelling arrangement substantially simultaneously, the first camera and the second camera being calibrated and their positions relative to each other being known; determine a point cloud comprising primary points from the diffraction pattern visible in the first and second images; and use each primary point of the point cloud in the first and second images as an initial point for search spaces for secondary points in the first and second images.

According to a sixth aspect, there is provided an apparatus comprising at least one processor and at least one memory connected to the at least one processor. The at least one memory stores program instructions that, when executed by the at least one processor, cause the apparatus to control a structural light source of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model; record a first image of the surface comprising the diffraction pattern with a first camera of the modelling arrangement and a second image of the surface comprising the diffraction pattern with a second camera of the modelling arrangement substantially simultaneously, the first camera and the second camera being calibrated and their positions relative to each other being known; determine a point cloud comprising primary points from the diffraction pattern visible in the first image; identify the corresponding primary points from the second image; and use each primary point of the point cloud in the first and second images as an initial point for search spaces for secondary points in the first and second images.

In an implementation form of the fifth aspect or the sixth aspect, the at least one memory stores program instructions that, when executed by the at least one processor, cause the apparatus to form partial image pairs of the first and second images by dividing the first image and the second image to a set of partial images, each partial image pair comprising a partial image of the first image and a corresponding partial image of the second image, and wherein each partial image of the first image and the second image comprise the same single primary point of the point cloud; identify corresponding secondary points in the partial image pairs, each secondary point having x and y image coordinates; and calculate X, Y and Z coordinates in an external coordinate system for each secondary point based on the x and y image coordinates of the secondary point and the camera positions.

In an implementation form of the fifth aspect or the sixth aspect, the at least one memory stores program instructions that, when executed by the at least one processor, cause the apparatus to form partial image pairs of the first and second images by dividing the first image and the second image to a set of partial images, each partial image pair comprising a partial image of the first image and a corresponding partial image of the second image, and wherein each partial image pair of the first image and the second image comprises a closed area defined by at least three primary points; identify corresponding secondary points within the closed area in the partial image pairs, each secondary point having x and y image coordinates, and calculate X, Y and Z coordinates in an external coordinate system for each secondary point based on the x and y image coordinates.

In further implementation form of the fifth aspect or the sixth aspect, the at least one memory stores program instructions that, when executed by the at least one processor, cause the apparatus to exclude the at least three primary points from the partial image pairs; determine a first maximum intensity in the partial image of the first image and a second maximum intensity in the partial image of the second image from which the at least three primary points have been excluded; normalize an intensity of each pixel in the partial image of the first image based on the first maximum intensity; and normalize an intensity of each pixel in the partial image of the second image based on the second maximum intensity.

In a further implementation form of the fifth aspect or the sixth aspect, the at least one memory stores program instructions that, when executed by the at least one processor, cause the apparatus to divide each partial image into sub-blocks; and identify corresponding secondary points in the sub-blocks.

In a further implementation form of the fifth aspect or the sixth aspect, the at least one memory stores program instructions that, when executed by the at least one processor, cause the apparatus to search a secondary point in the partial image of the second image, the secondary point corresponding to a secondary point in the corresponding partial image of the first image, in a search area along the corresponding epipolar line in the partial image of the second image having substantially the same distance along the epipolar line from the primary point in the partial image of the second image than a distance between the secondary point in the partial image of the first image and the primary point in the partial image of the first image.

In a further implementation form of the fifth aspect or the sixth aspect, the at least one memory stores program instructions that, when executed by the at least one processor, cause the apparatus to search a secondary point in the partial image of the second image, the secondary point corresponding to a secondary point in the corresponding partial image of the first image, in a search area in the partial image of the second image having substantially the same distance from the primary point in the partial image of the second image than a distance between the secondary point in the partial image of the first image and the primary point in the partial image of the first image.

According to a seventh aspect, there is provided an apparatus comprising means for controlling a structural light source of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model; means for causing recording of a first image of the surface comprising the diffraction pattern with a first camera of the modelling arrangement and a second image of the surface comprising the diffraction pattern with a second camera of the modelling arrangement substantially simultaneously, the first camera and the second camera being calibrated and their positions relative to each other being known; means for determining a point cloud comprising primary points from the diffraction pattern visible in the first and second images; and means for using each primary point of the point cloud in the first and second images as an initial point for search spaces for secondary points in the first and second images.

According to an eight aspect, there is provided an apparatus comprising means for controlling a structural light source of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model; means for causing recording of a first image of the surface comprising the diffraction pattern with a first camera of the modelling arrangement and a second image of the surface comprising the diffraction pattern with a second camera of the modelling arrangement substantially simultaneously, the first camera and the second camera being calibrated and their positions relative to each other being known; means for determining a point cloud comprising primary points from the diffraction pattern visible in the first image; means for identifying the corresponding primary points from the second image; and means for using each primary point of the point cloud in the first and second images as an initial point for search spaces for secondary points in the first and second images.

In an implementation form of the seventh aspect or the eight aspect, the apparatus comprises means for forming partial image pairs of the first and second images by dividing the first image and the second image to a set of partial images, each partial image pair comprising a partial image of the first image and a corresponding partial image of the second image, and wherein each partial image of the first image and the second image comprise the same single primary point of the point cloud; means for identifying corresponding secondary points in the partial image pairs, each secondary point having x and y image coordinates; and means for calculating X, Y and Z coordinates in an external coordinate system for each secondary point based on the x and y image coordinates of the secondary point and the camera positions.

In an implementation form of the seventh aspect or the eight aspect, the apparatus comprises means for forming partial image pairs of the first and second images by dividing the first image and the second image to a set of partial images, each partial image pair comprising a partial image of the first image and a corresponding partial image of the second image, and wherein each partial image pair of the first image and the second image comprises a closed area defined by at least three primary points; means for identifying corresponding secondary points within the closed area in the partial image pairs, each secondary point having x and y image coordinates, and means for calculating X, Y and Z coordinates in an external coordinate system for each secondary point based on the x and y image coordinates.

In further implementation form of the seventh aspect or the eight aspect, the apparatus comprises means for excluding the at least three primary points from the partial image pairs; determining a first maximum intensity in the partial image of the first image and a second maximum intensity in the partial image of the second image from which the at least three primary points have been excluded; normalizing an intensity of each pixel in the partial image of the first image based on the first maximum intensity; and normalizing an intensity of each pixel in the partial image of the second image based on the second maximum intensity.

In a further implementation form of the seventh aspect or the eight aspect, the apparatus comprises means for dividing each partial image into sub-blocks; and means for identifying corresponding secondary points in the sub-blocks.

In a further implementation form of the seventh aspect or the eight aspect, the apparatus comprises means for searching a secondary point in the partial image of the second image, the secondary point corresponding to a secondary point in the corresponding partial image of the first image, in a search area along the corresponding epipolar line in the partial image of the second image having substantially the same distance along the epipolar line from the primary point in the partial image of the second image than a distance between the secondary point in the partial image of the first image and the primary point in the partial image of the first image.

In a further implementation form of the seventh aspect or the eight aspect, the apparatus comprises means for searching a secondary point in the partial image of the second image, the secondary point corresponding to a secondary point in the corresponding partial image of the first image, in a search area in the partial image of the second image having substantially the same distance from the primary point in the partial image of the second image than a distance between the secondary point in the partial image of the first image and the primary point in the partial image of the first image.

According to a ninth aspect of the invention, there is provided a computer program comprising program code arranged to perform the method of the first aspect or the second aspect.

According to a tenth aspect of the invention, there is provided a computer-readable medium comprising a computer program comprising program code arranged to perform the method of the first aspect or the second aspect.

At least some of the aspects and implementation forms may provide one or more effects and/or advantages. The solution may enable significantly to increase the spatial resolution of the modelling arrangement in real-time or near real-time solutions with a substantially reduced processing time. This may also increase the usability of the modelling arrangement for various applications involving accurate object identification and with algorithms requiring denser three-dimensional data about a scene. An increased spatial resolution means that scene objects will be sampled much more densely than with prior solutions while simultaneously keeping the accuracy of the measured points higher than with known sensors that produce dense point clouds. Furthermore, the disclosed solution may allow to separate the extremely high accuracy primary points from the secondary points for applications that must use extremely high quality three-dimensional data.

LIST OF FIGURES

The invention will be described below in detail by means of examples of embodiments, wherein FIG. 1 illustrates a modeling system according to an aspect of the invention.

FIGS. 4B and 4C illustrate an example of a pair of corresponding partial images.

FIGS. 5A and 5B illustrate an example of identifying corresponding secondary points in a pair of partial images.

DETAILED DESCRIPTION OF THE INVENTION

Figure 1:
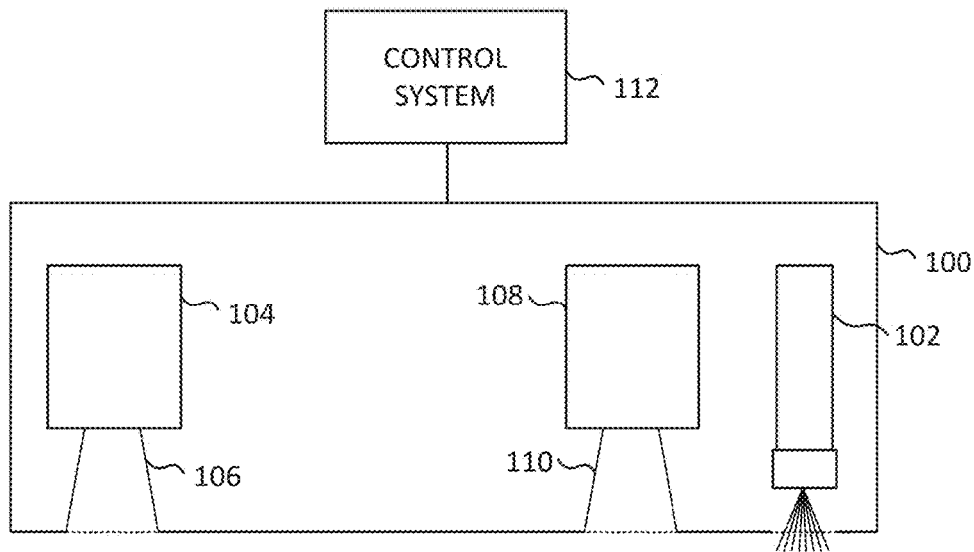

FIG. 1 illustrates a modeling system according to an aspect of the invention. The modelling system comprises a modelling arrangement 100 and a control system 112. The modelling arrangement 100 comprises a structural light source 102 configured to produce a diffraction pattern of a known geometry on a surface to be modeled. The structural light source 102 may comprise a laser light source and a diffraction element through which light from the laser light source travels. The structural light source 102 may be configured to produce substantially monochromatic and coherent electromagnetic radiation. The diffraction pattern provided by the structural light source 102 accurately complies with a mathematical-physical model and wherein beam output angles of the diffraction pattern are accurately known based on the mathematical-physical model. In other words, the diffraction pattern provided by the structural light source 102 is modelled based on the mathematical-physical model. The geometry of the point cloud produced by the diffraction may depend on a grating used in the diffraction source, and any suitable point geometry can be used. In one example, the structural light source 102 may produce radiation that contains only one wavelength or a plurality of wavelengths at the same time, for example, red, green and blue coherent light.

The modelling arrangement 100 further comprises a first camera 108 configured to photograph the surface to be modeled at wavelengths emitted by the structural light source 102, and a second camera 104 configured to similarly photograph the surface to be modeled at wavelengths emitted by the structural light source 102. The image files may be automatically transferred from the first and second cameras to the control system 112, for example, by means of wireless data transfer.

The modelling arrangement 100 is calibrated so that relative orientations of the optical axis of the first camera 108 and the second camera 104 and the diffraction axis of the structural light source 102 are known, and wherein the position, distance and orientation of the output point of the structural light source 102 to the first camera 108 and the second camera 104 are known. The calibration may also take into account optical qualities and distortions of lenses of the cameras 104, 108.

The modelling system comprises also a control system 112 connected to the modelling arrangement 100. The control system 112 is configured to control operations of the modelling arrangement 100. The control system 112 may comprise a computer equipped with appropriate software to control the cameras 104, 108 and to process images recorded with the cameras 104, 108.

The control system 112 may also be configured to control the structural light source 102 to produce the diffraction pattern of known geometry on the surface to be modeled. The control system 112 may further be configured to cause recording of a first image of the surface comprising the diffraction pattern with the first camera 108 and a second image of the surface comprising the diffraction pattern with the second camera 104 substantially simultaneously. The term "substantially simultaneously" means that the first camera and the second camera are configured to photograph the same object with the diffraction pattern simultaneously or nearly simultaneously.

When the first and second images have been recorded, the control system 112 may be configured to determine a point cloud comprising primary points from the diffraction pattern visible in the first and second images. In another embodiment, the control system 112 may be configured to determine a point cloud comprising primary points from the diffraction pattern visible in the first image and identify the corresponding primary points from the second image. The point cloud is designed and implemented so that unambiguous identification of each primary point within in an image is possible. In practice this means that in a specific section in the image there is only one possible primary point that can be there. The control system 112 is further configured to use each primary point of the point cloud in the first and second images as initial points for search spaces for secondary points in the first and second images. The secondary points may be artifacts of lesser intensity that lie between the primary points of the image and for which accurate three-dimensional positions can be calculated. The secondary points may be background light that falls within the used bandwidth. Further, its intensity may be significantly lesser than that of the primary points. As another example, the secondary points may be noise generated by the diffraction element. As another example, the secondary points may be patterns or noise generated by separate light source. Further, in an embodiment, primary points are bright clearly visible spots created by the diffractive element and secondary points are points created between these points by either means of determining a disparity image between corresponding partial images of the first and the second images or identifying features of clearly lower intensity than the primary points from the partial images from the first and the second image and determining their corresponding 3D coordinates by photogrammetric methods.

In one example, the separate lights source may be integrated to the modelling arrangement 100. As the possible search spaces are significantly reduced in size, this enables a solution that is able in real-time or nearly real-time to provide an accurate three-dimensional representation of the surface.

The control system 112 may be provided in immediate proximity to the modeling arrangement 100. Alternatively the control system 112 may be physically present in any other location, as long as the control system 112 is able to download the images taken by the cameras 104, 108 via a data communication network, for example, the Internet.

The control system 112 may comprise one or more processors and one or more memories connected to the processor. Through a data transfer interface, the control system 112 may receive information from external devices or systems. The memory may contain one or more computer programs containing program code which is arranged to perform the method steps described herein.

Figure 2:
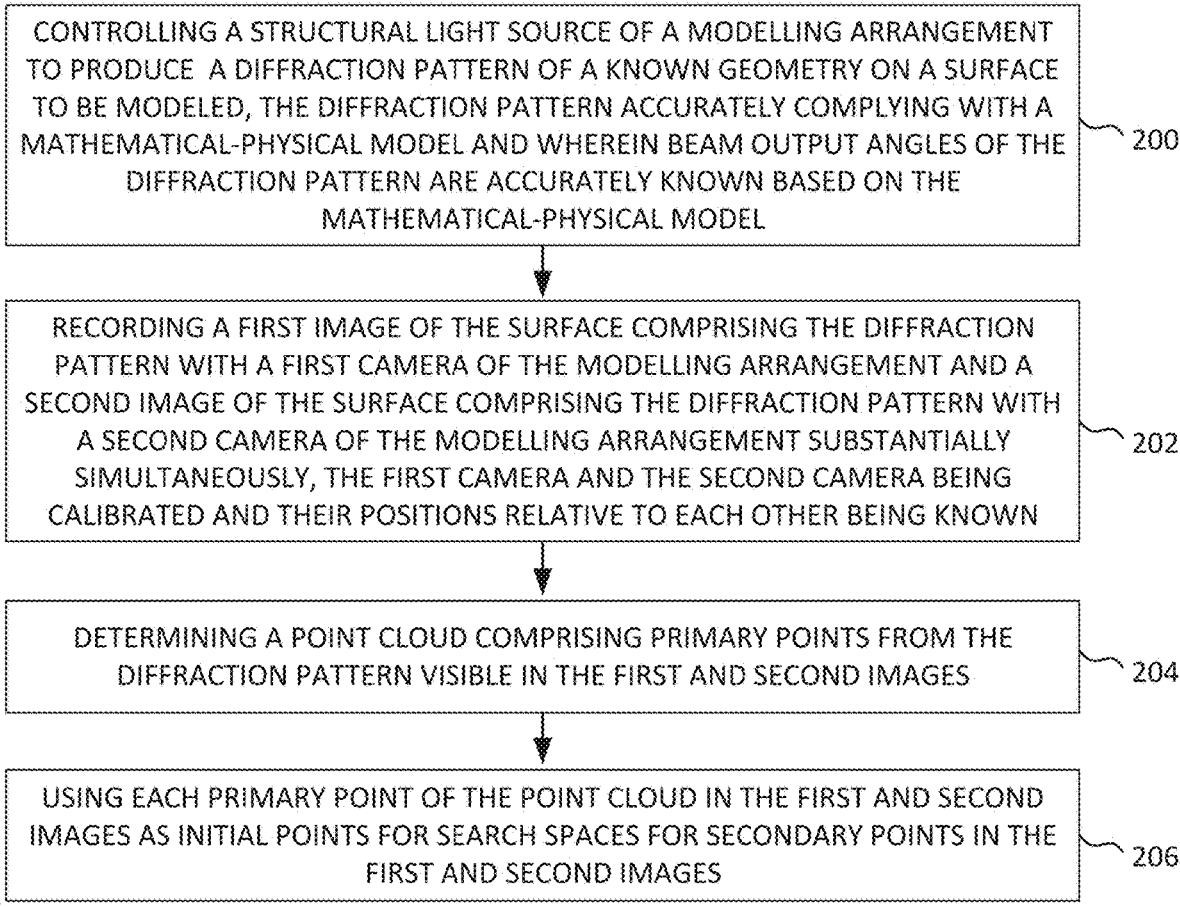
FIG. 2 illustrates a block diagram method for obtaining and processing images.

FIG. 2 illustrates a block diagram method for obtaining and processing images. The method may be implemented as a computer program performed by a computer.

At 200 a structural light source of a modelling arrangement is controlled to produce a diffraction pattern of a known geometry on a surface to be modeled. The diffraction pattern accurately complies with a mathematical-physical model and wherein beam output angles of the diffraction pattern are accurately known based on the mathematical-physical model. The geometry of the diffraction depends on a grating used in the diffraction source, and any suitable point geometry can be used.

At 202 recording of a first image of the surface comprising the diffraction pattern with a first camera of a modelling arrangement and a second image of the surface comprising the diffraction pattern with a second camera of the modelling arrangement are caused substantially simultaneously. The structural light source, the first camera and the second camera have been calibrated so that relative orientations of the optical axis of the first camera and the second camera and the diffraction axis are known. Further, the position, distance and orientation of the output point of the structural light source to the first camera and the second camera are known. The calibration may also take into account optical distortions of the lenses of the cameras.

At 204 a point cloud comprising primary points is determined from the diffraction pattern visible in the first image and the corresponding primary points are identified from the second image.

At 206 each primary point of the point cloud in the first and second images is used as an initial point for search spaces for secondary points in the first and second images. The secondary points may be artifacts of lesser intensity that lie between the primary points of the image that lie between two primary points and for which accurate three-dimensional positions can be calculated. The secondary points may be background light that falls within the used bandwidth. Further, its intensity may be significantly lesser than that of the primary points. As another example, the secondary points may be noise generated by the diffraction element. As another example, the secondary points may be patterns or noise generated by separate light source. The separate lights source may be integrated to the modelling arrangement. As the possible search spaces are significantly reduced in size, this enables a solution that is able in real-time or nearly real-time to provide an accurate three-dimensional representation of the surface.

Corresponding secondary points in the first and second images may be identified using any image processing solution or algorithm that is able to find corresponding points from two images. When the corresponding secondary points in images have been identified, each secondary point has x and y image coordinates. Based on the x and y image coordinates of the secondary point and the camera positions, X, Y and Z coordinates in an external coordinate system may be calculated for each secondary point.

Figure 3:
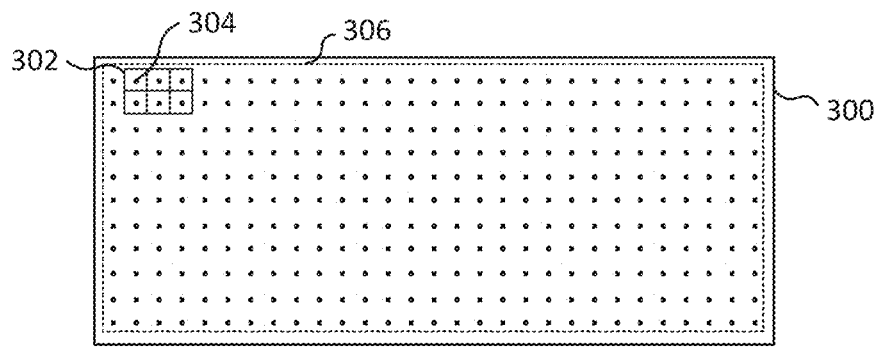
FIG. 3 illustrates a simplified image comprising a point cloud determined from a diffraction pattern.

FIG. 3 illustrates a simplified image 300 comprising a point cloud 306 determined from a diffraction pattern visible in an image recorded with a first camera. Each point 304 of the point cloud 306 is accurately identifiable and has very accurate three-dimensional coordinates.

FIG. 3 illustrates an embodiment in which a plurality of partial images 302 are formed from the whole image 300. Although FIG. 3 illustrates only six partial images 302, other partial images of the image 300 are generated similarly. A similar operation, i.e. forming partial images, may be done to an image recorded substantially simultaneously with a second camera.

Each partial image 302 of the image 300 comprises a single primary point 304 of the point cloud. This is exemplified in FIG. 3 with a dot in a center of each partial image 302. By dividing the image 300 into partial images 302, it is possible to process each partial image separately and in a parallel manner. Each primary point of the point cloud in a partial image 302 can be used as an initial point for search spaces for secondary points in the partial image 302. The secondary points are points that lie between two primary points and for which accurate three-dimensional positions can be calculated.

Figure 4A:
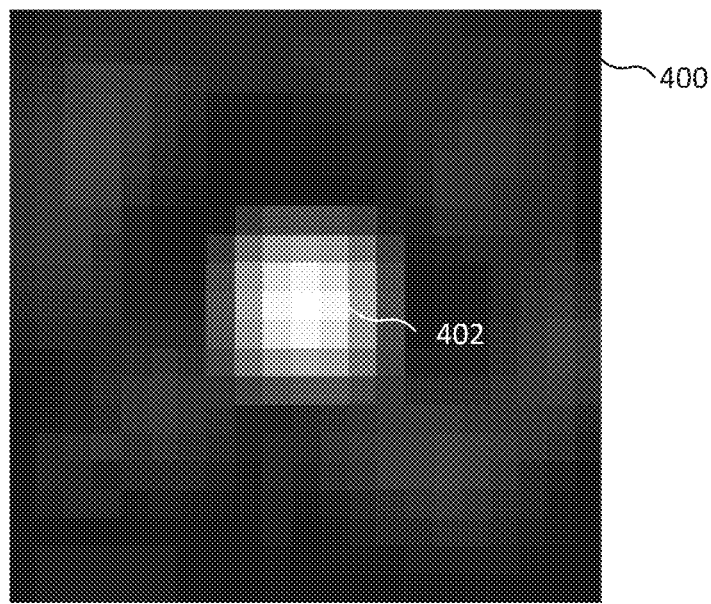
FIG. 4A illustrates an example of a partial image of a larger image captured with a camera.

FIG. 4A illustrates an example of a partial image 400 of a larger image captured with a camera. The partial image 400 may correspond to a partial image 302 illustrated in FIG. 3.

The partial image 400 comprises a single primary point 402 of a point cloud as a center point. As discussed already earlier, a point cloud comprising primary points is determined from the diffraction pattern visible in an image. The diffraction pattern accurately complies with a mathematical-physical model and wherein beam output angles of the diffraction pattern are accurately known based on the mathematical-physical model. Similar partial images are formed from the image for each other primary point of the point cloud.

FIGS. 4B and 4C illustrate a pair of corresponding partial images. A partial image 400A is a partial image of an image recorded with a first camera and a partial image 400B is a corresponding partial image of an image recorded with a second camera. Both partial images 400A, 400B include the same primary point 402A, 402B of the point cloud as a center point.

FIGS. 5A and 5B illustrate an example of identifying corresponding secondary points in a pair of partial images 514A, 514B. In addition to FIGS. 4B and 4C, FIGS. 5A and 5B now illustrate that both partial images include shapes 504A, 506A, 508A, 510A, 512A; 504B, 506B, 508B, 510B, 512B that can be identified using one or more image processing algorithms. A shape may also refer to a secondary point already discussed earlier. For example, when a shape or secondary point 504A has been identified in the partial image 514A, a corresponding shape or secondary point 504B can be identified in the other partial image 500B. A search for a corresponding secondary point in the partial image 514B can be directed in a search area having substantially the same distance along the epipolar line from the primary point in the partial image 514B than a distance between the corresponding secondary point in the partial image 514A and the primary point in the partial image 514A. This means that the secondary point 504B in the partial image 514B can be found accurately and quickly.

Figures 6A, 6B:
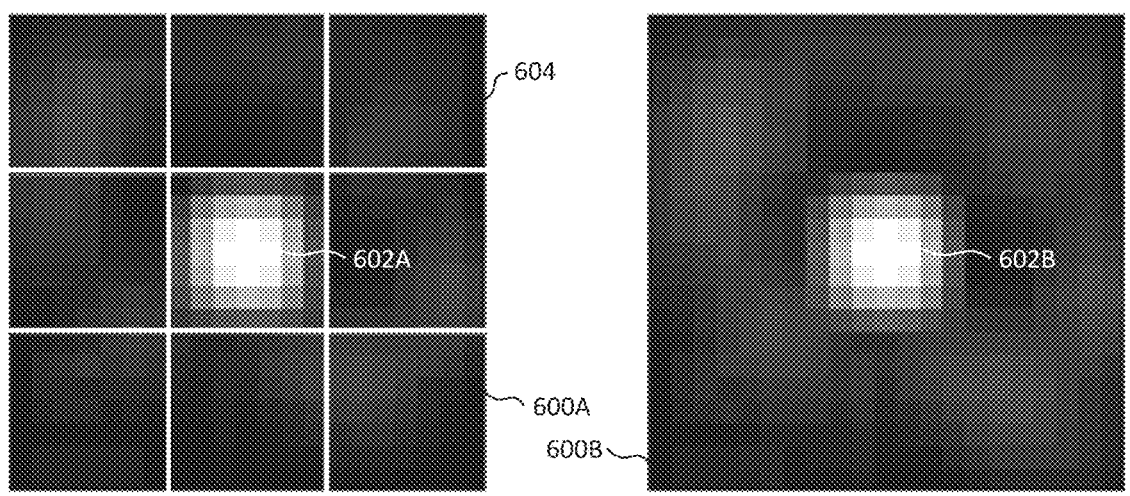
FIGS. 6A-6N illustrate another example of identifying corresponding secondary points in a pair of partial images.

FIGS. 6A-6F illustrate another example of identifying corresponding secondary points in a pair of partial images 600A, 600B. In FIG. 6A, the partial image 600A of a first image has been divided to a set of sub-blocks 604. In this particular example, the partial image 60A is divided to nine sub-blocks. A center sub-block comprises a primary point 602A. As the center block comprises the primary point 602A, there is no need to separately search for a corresponding point in the partial image 600B as it is already known (i.e. it is the primary point 602B). FIG. 6B illustrates a partial image 600B of a second image corresponding to the partial image 600A of the first image.

Figures 6C, 6D:
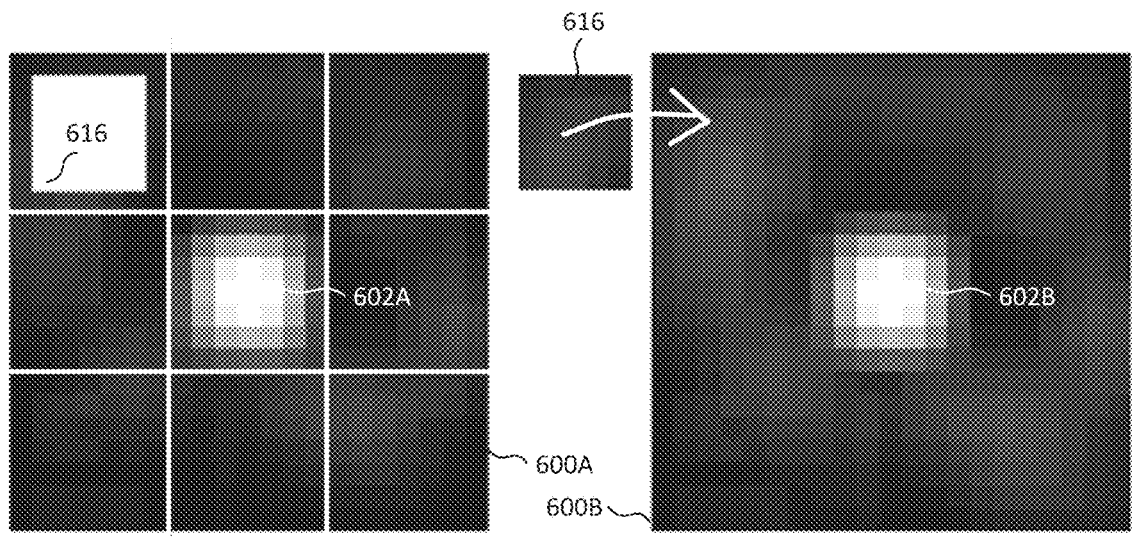
Figures 6E, 6F:
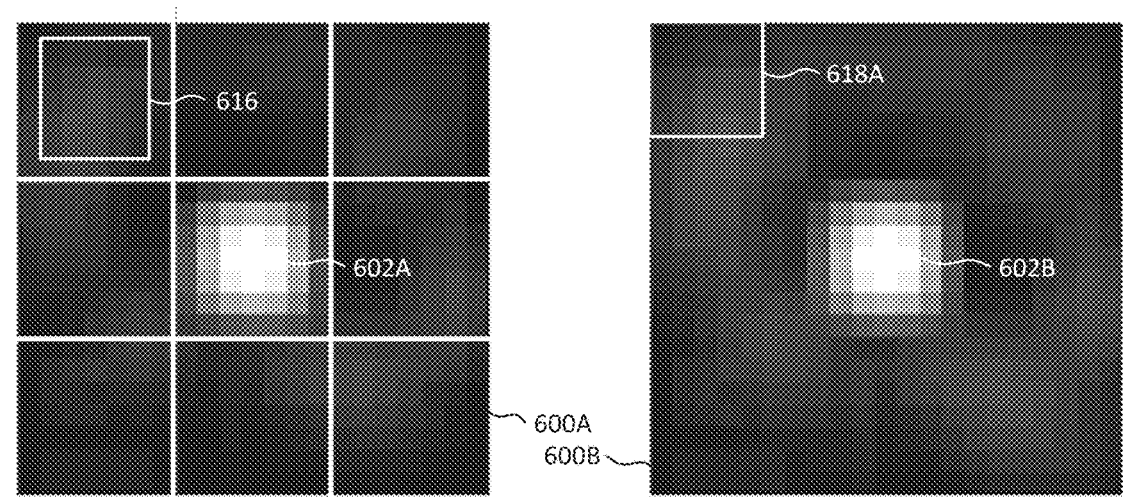
Figure 6G:
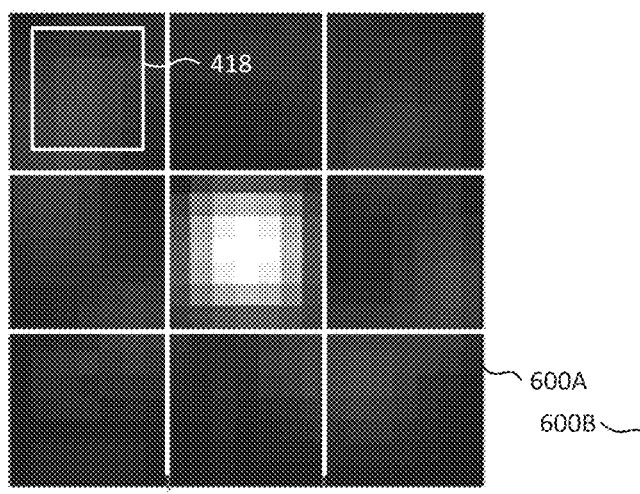
Figure 6H:
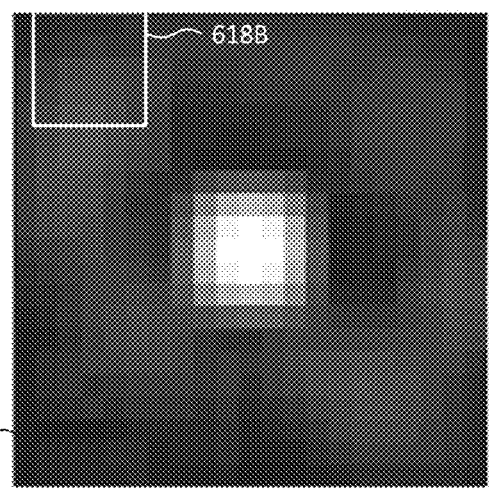
Figure 6I:
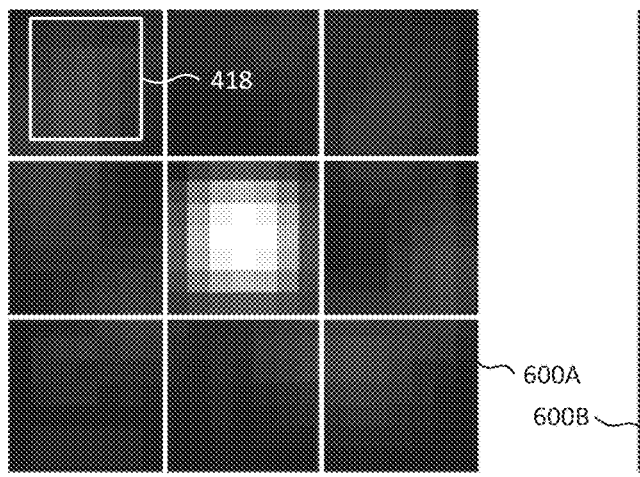
Figure 6J:
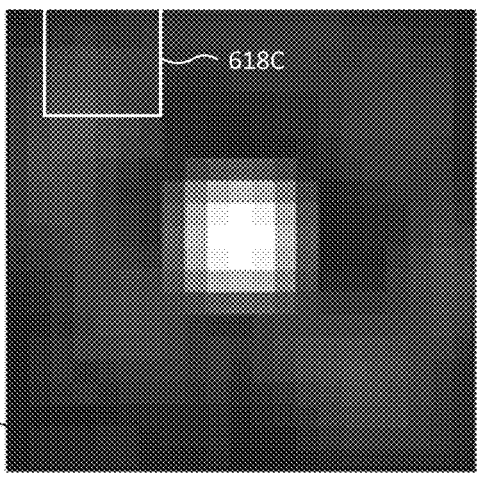
Figure 6K:
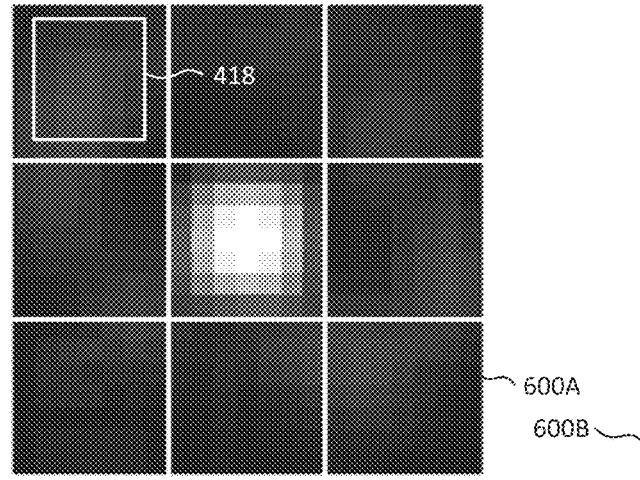
Figure 6L:
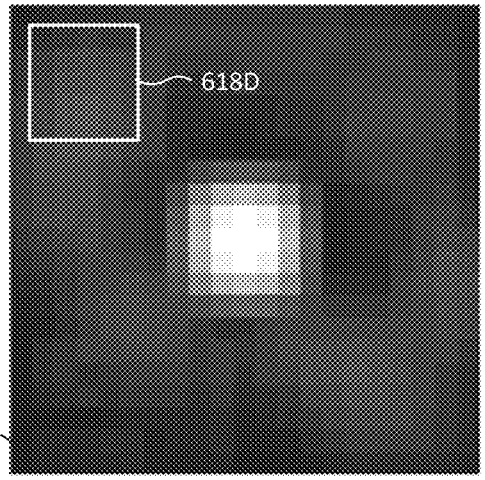
Figure 6M:
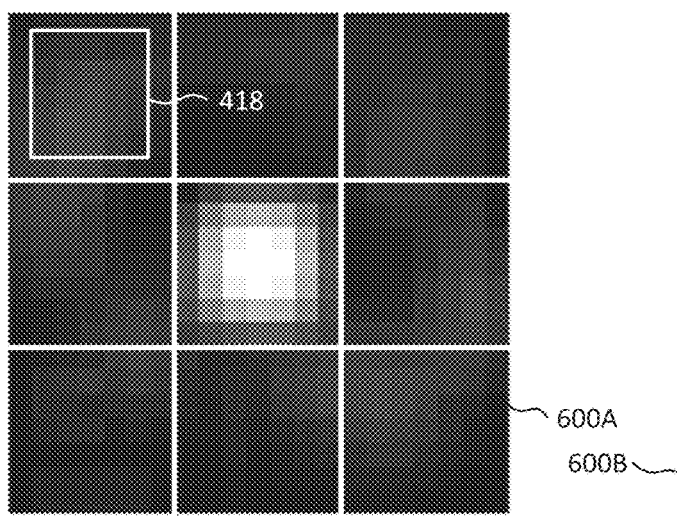
Figure 6N:
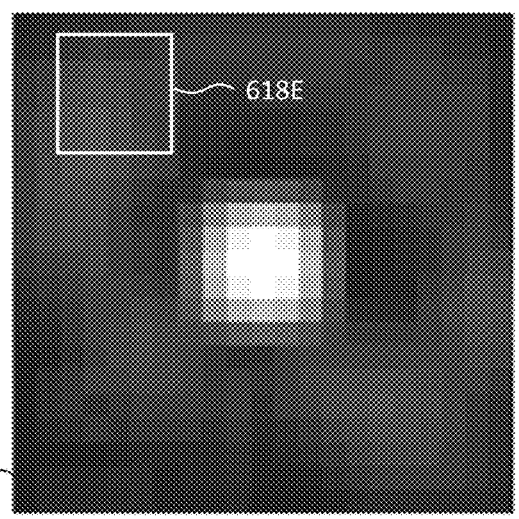

FIGS. 6C and 6D illustrate an example where a sub-block or a part 616 of the sub-block is used as a template for a search for a corresponding sub-block or a part of the sub-block in the partial image 600B. The sub-block or the part 616 of the sub-block of the partial image 600A may then be compared to pixels of the partial image 600B.

FIGS. 6E-6N illustrate an exemplary process for finding a corresponding secondary point in the partial image 600B.

Again, a section 616 in the sub-block in the left-hand corner of the partial image 600A is used as a template. FIGS. 6F-6N illustrate that the template is sequentially compared to a set of pixels 618A-618E of the partial image 600B in the corner of the partial image 600B. Although in FIGS. 6F-6N it may be illustrated that the set of pixels 618A-618E in the partial image 600B in each sequence moves only in direction, for example, in the horizontal direction, in other examples there may be both horizontal and vertical direction movement with set of pixels 618A-618E in the partial image 600B between two consecutive sequences.

At each comparison, a correlation coefficient may be calculated for the template 616 in the partial image 600A and the set of pixels 618A-618E in the partial image 600B. One possible solution for calculating the correlation coefficient is to use Pearson Correlation Coefficient:

$$\rho_{X,Y} = \frac{E[(X - \mu_X)(Y - \mu_Y)]}{\sigma_X \sigma_Y}$$

The quantitative measure of the degree of association of two distinct variables is often coined as correlation coefficient, and it typically ranges between −1 and 1. If the correlation coefficient is 1, there is a high correlation between the two variables.

When all correlation coefficients have been calculated, the set of pixels 618A-618E in the partial image 600B moved within the partial image 600B during the calculations having the highest correlation coefficient is the best correspondence for the template 616.

Center points of the template 616 and the best corresponding set of pixels 618A-618E in the partial image 600B form a pair of observed image points. Based on the pair of observed image points and based on the positions of the two calibrated cameras used to capture the two images, it is possible to calculate three-dimensional coordinates in an external coordinate system. In other words, firstly corresponding secondary points in the partial image pairs can be identified, each secondary point having x and y image coordinates. And secondly, X, Y and Z coordinates in the external coordinate system for each secondary point can be calculated based on the x and y image coordinates of the secondary point and the camera positions by using, for example, triangulation.

In an embodiment, the examples and embodiments disclosed above provide pixel level accuracy in finding corresponding points in the two images. In a further embodiment, the pixel level accuracy may be extended even further to sub pixel accuracy. The sub pixel accuracy refers to identifying the location of an object with accuracy greater than the pixel level. For example, this may mean defining a center point of a circle observed from the image in pixel coordinates with decimal point accuracy instead of merely referring to the integer pixel values. Furthermore, achieving sub pixel accuracy might involve interpolating and/or re-sampling pixel values of the image, which is one commonly used method in finding a best match for a template image. In another example, achieving sub pixel accuracy might involve fitting a continuous smooth function to the correlation values in different locations and finding the local maxima.

The term "calibrated camera" may refer to 1) determining distortion errors of a lens or lens system of the camera and to 2) determining an internal geometry of the camera. The distortion errors may refer to changes in the image geometry caused by physical properties of the lens. In an image distortion errors may be seen, for example, as barrel distortion and pincushion distortion. The distortion error may be mathematically corrected. The determination of the internal geometry of the camera may comprise determining the focal length of the lens or lens system, the principal point of the camera and an aspect ratio.

The focal length depends on the physical properties of the lens and describes the distance of the optical center point of the lens system and the image plane. Furthermore, with image observation coordinates it describes the direction where a phenomenon observed from the image lies and the scale of objects on the image plane in relation to their distance from the camera.

The principal point is the point on the image plane where the optical axis crosses it. Lens distortion depends from a distance to the principal point where the distortion is zero.

The aspect ratio describes the asymmetry of the scale of different image axis. This may be due to lens properties of the structure or assembly of the photovoltaic cells on the image plane. The aspect ratio may be defined by using different focal lengths for x and y coordinates. The internal geometry is defined simultaneously with lens distortion parameters by observing objects with known geometries.

Further, in one embodiment, the calibration of the camera lens is performed only once, and optical distortions of the images are corrected by the obtained calibration information by moving the pixels of the images to the correct positions.

The two cameras may also be calibrated with respect to each other. The camera 104 positioned farther from a structural light source 102 of a modelling arrangement illustrated 100 in FIG. 1 determines the measurement coordinate system, and the other camera 108 is positioned with respect to that. The origin of the measurement coordinate system is a projection center of the camera 104. The axes of the measurement coordinate system are parallel with axes of an image coordinate system of an image, and the third axis being perpendicular to the image plane is an optical axis of the camera. After the calibration, observations of the camera 104 are by definition directly in the measurement coordinate system, whereas observations of the camera 108 can be converted to the measurement coordinate system.

Although the embodiments and examples above have only disclosed analysis based on separate photographs or images, it is obvious for a person skilled in the art also to apply the invention so that several individual photographs are combined into a larger unity of the surface to be modeled. In this case, the modeling arrangement described in the invention can be manually or automatically moved in the photographing situation so that the desired arrangement can be modeled.

The embodiments of the invention described above may be used in many different application environments, for example in measuring walls of a tunnel, rock material identification, forest applications (for example in evaluating a forest stand), automotive industry or any other application for modeling a surface.

FIGS. 7A-7F illustrate an embodiment for normalizing areas between primary points 702, 704, 706, 708 from a diffraction pattern visible in first and second images. Earlier discussed embodiments in relation to FIGS. 1-3 provide a more detailed description about obtaining the first and second images.

Figure 7A:
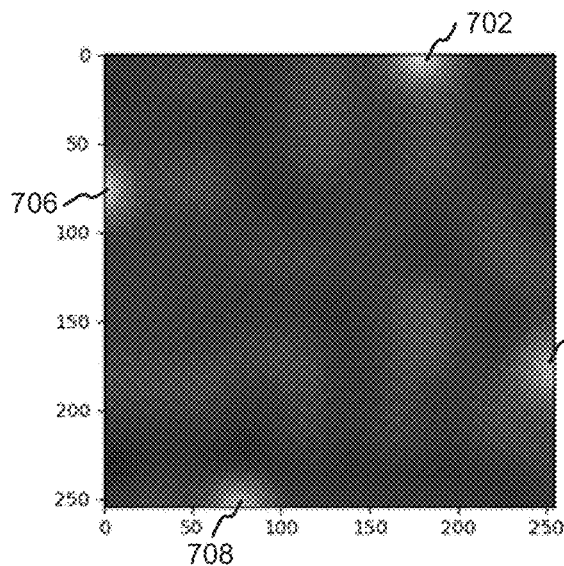
FIGS. 7A-7F illustrate an embodiment for normalizing areas between primary points from a diffraction pattern visible in first and second images.
Figure 7B:
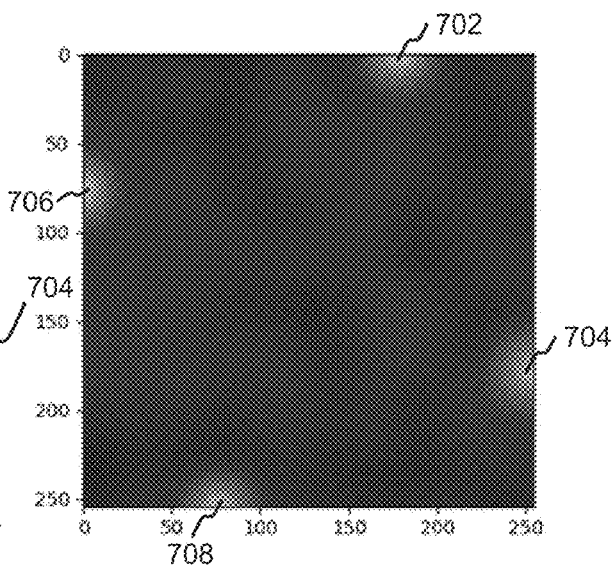

FIG. 7A illustrates a partial area taken from the first image. Similarly, FIG. 7B illustrates a corresponding partial area taken from the second image. Both areas partial are restricted by the four primary points 702, 704, 706, 708. FIGS. 7A and 7B illustrate a situation in which overall sensitivity from background objects in the first and second images differ from each other.

Figure 7C:
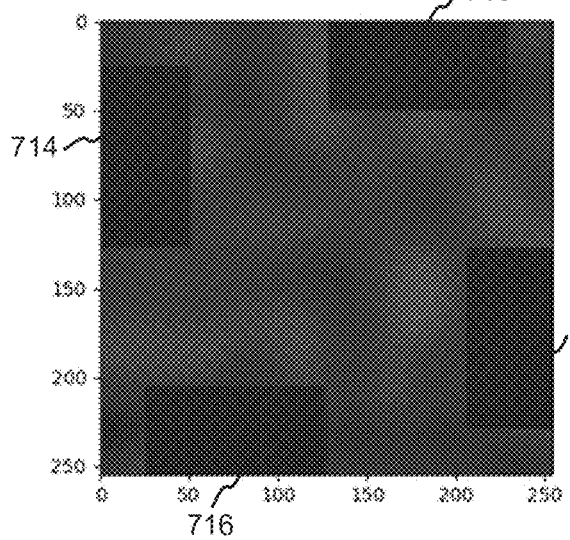
Figure 7D:
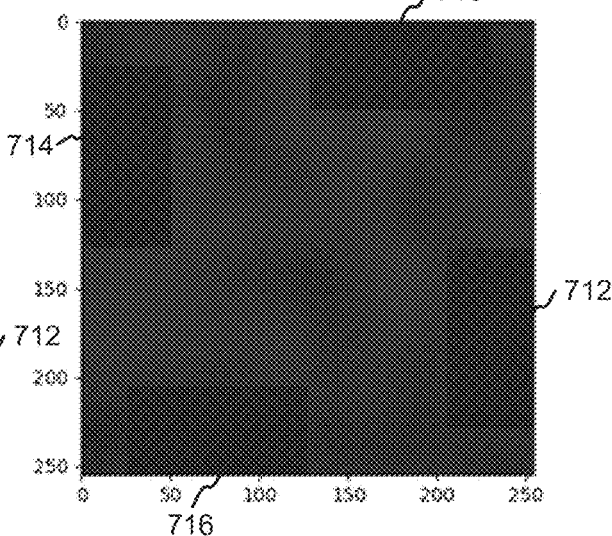

As the primary points 702, 704, 706, 708 in the partial areas taken from the first and second images can be identified accurately, the primary points 702, 704, 706, 708 can be excluded from the partial areas. The exclusion of the primary points 702, 704, 706, 708 may be performed, for example, by replacing intensity values of the primary points 702, 704, 706, 708 with small values, for example, with 0. In another embodiment, intensity values relating to the primary points 702, 704, 706, 708 may be omitted when determining a maximum intensity from the partial areas of the first and second images in the next step. FIGS. 7C and 7D illustrate the excluded partial areas 710, 712, 714, 716. Although FIGS. 7C and 7D illustrate that intensities of the primary points 702, 704, 706, 708 have been replaced with small values by using a rectangular shape, any other exclusion method and/or shape can be used.

Next a maximum intensity $max_I$ is determined from both partial areas of the first and second images that have been excluded (i.e. from partial areas illustrated in FIGS. 7C and 7D). In this example, the highest possible value for the intensity is 1.0. As an example, the maximum intensity $max_I$ in FIG. 7C may be 0.333 and the maximum intensity $max_I$ in FIG. 7D may be 0.143. The, a normalized intensity $I(x,y)_N$ for an image pixel (x,y) may be calculated with the following equation:

$$I(x,y)_N = \min(I(x,y)_E * C/max_I, 1.0)$$

where $I(x,y)_E$ is an intensity of the image pixel (x,y) before normalization and C is a positive coefficient, for example, 0.9. The min( ) function ensures that the normalized intensity $I(x,y)_N$ is between values [0, 1.0].

Figure 7E:
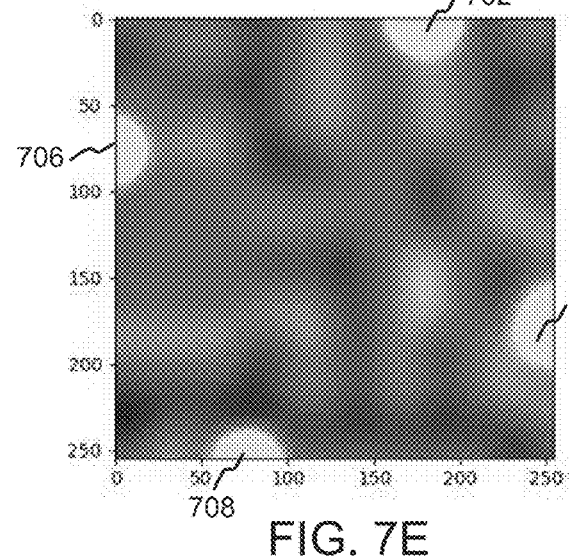
Figure 7F:
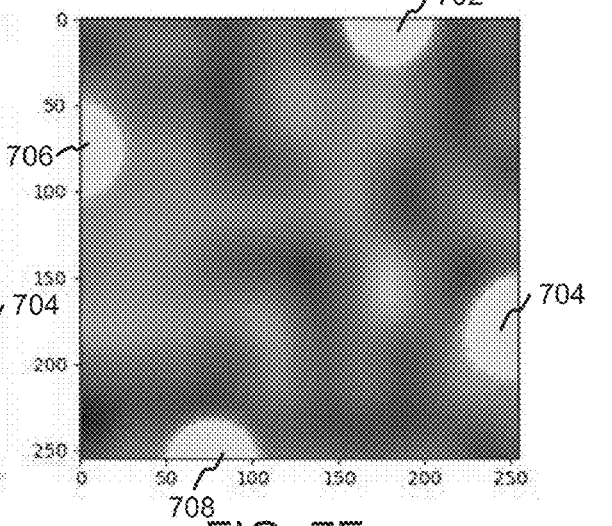

FIGS. 7E and 7F illustrates normalized partial areas taken from the first and second images. From FIGS. 7E and 7F it can be seen that signals between the primary points 702, 704, 706, 708 become in an equal status so that differences between the areas illustrated in FIGS. 7E and 7F are minimal.

The above illustrated normalization process enables a solution in which a background object in the first and second images is brought forward to that equal features appear similarly in both images. Further, the above illustrated normalization process enables a solution in which intensities in an image pair (i.e. the first image and the second image) can be normalized so that the images of the image pair can be processed independently.

Figure 8A:
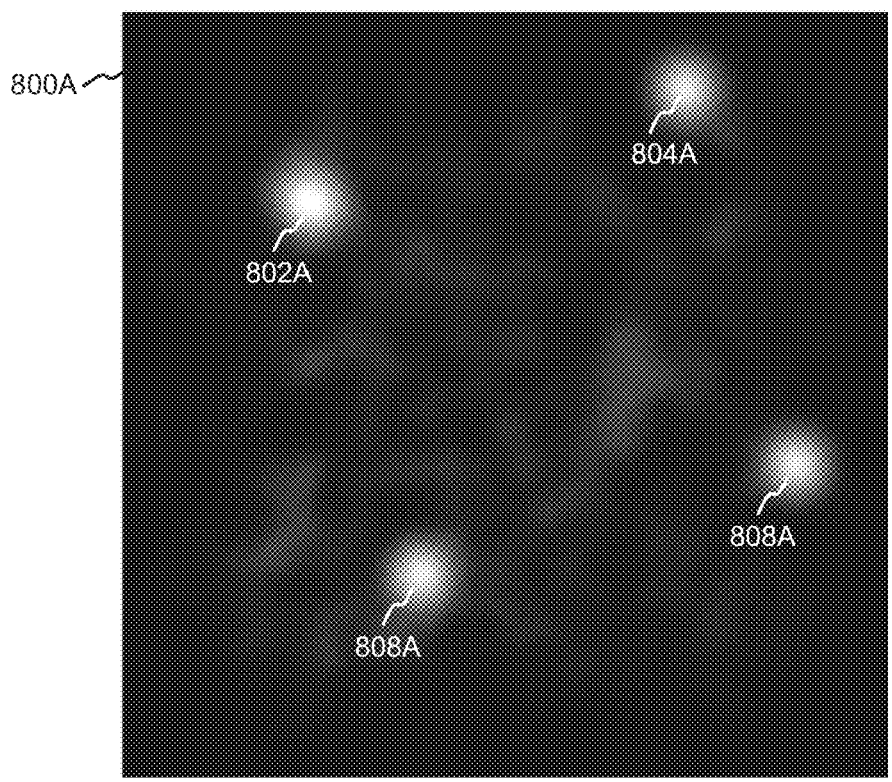
FIGS. 8A-8C illustrate an embodiment for reducing a search space for a disparity matching or feature search.
Figure 8B:
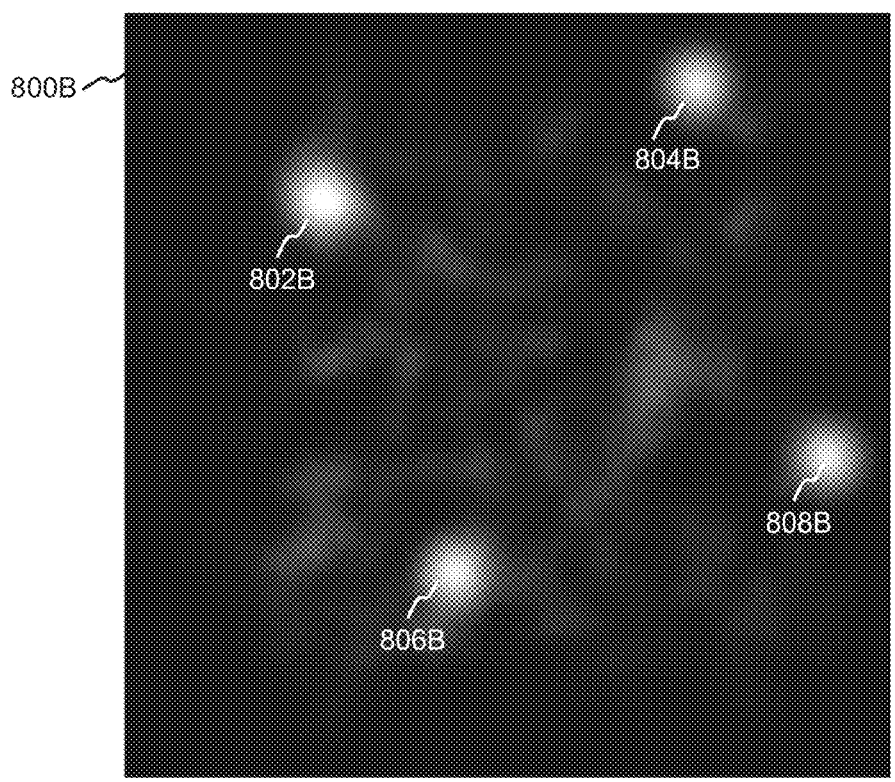
Figure 8C:
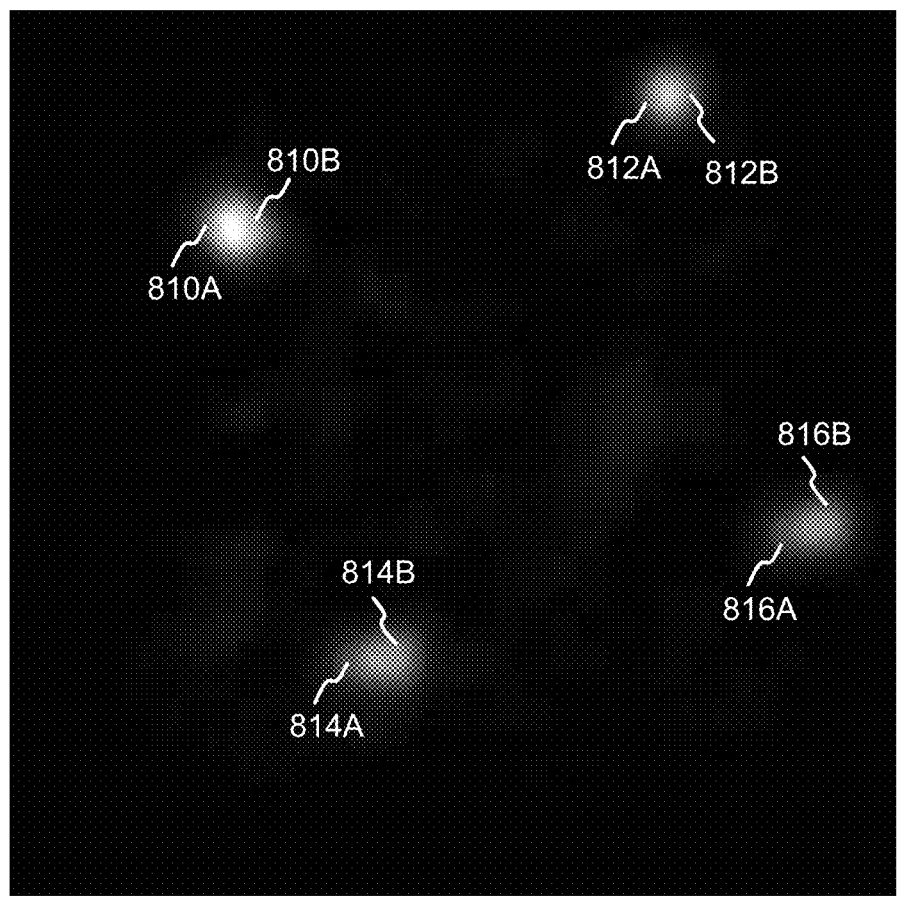

FIGS. 8A-8C illustrate an embodiment for reducing a search space for a disparity matching or feature search. FIGS. 8A-8C illustrate partial images of a larger image. Earlier discussed embodiments in relation to FIGS. 1-3 provide a more detailed description about obtaining the larger images.

FIG. 8A illustrates a first partial image 800A obtained using the first camera containing four primary points 802A, 804A, 806A, 808A and an area inside the quadrilateral they define. Similarly, FIG. 8B illustrates a second partial image 800B obtained using the second camera containing four primary points 802B, 804B, 80B, 808B and an area inside the quadrilateral they define.

The partial images 800A, 800B are of the same area and are very similar with minor differences caused, for example, by camera sensor noise and optical deformations. As can be seen from FIG. 1, the first and second cameras are located in different places, and differing camera locations cause perspective differences between the images obtained from the first and second cameras.

FIG. 8C illustrates a composite image where the two partial images 800A, 800B have been put together centered around top left corner point 802A, 802B. References 810A, 812A, 814A, 816A indicate bright spots in the first partial image 800A and references 810B, 812B, 814B, 816B indicate bright spots in the second partial image 800B. It can be seen that the two lower bright points 814A, 814B and 816A, 816B are clearly separated in the two partial images 800A, 800B. This means that the three-dimensional location of these points is on a different distance from the first and second cameras than the top left corner point 810A, 810B that is the reference point.

The benefit of using multiple points, for example, three or four points, compared to the case of using only one point, in forming the disparity image or feature search is that the search area is closed by known exactly matching points. Based on the accurately known shift on these corner points the disparity (or the location of a feature in the second image) can be estimated by creating a function to estimate the disparity at any point on the image. This estimated disparity (or a horizontal parallax) is the best a priori estimate of the correspondence for a feature or a pixel from the first image obtained from the first camera in the second image obtained from the second camera. The search of the best match can now be concentrated around that a priori estimate for optimal real time performance. Further, when using multiple points to define a search area, this is equivalent to fitting a surface to the nearby known three-dimensional points. This further reduces the search space for disparity matching or feature search making the operation faster.

Figure 9:
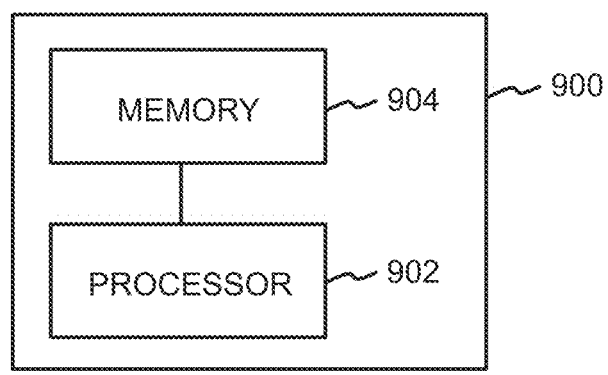
FIG. 9 illustrates an exemplary apparatus for controlling a modelling arrangement.

FIG. 9 illustrates an apparatus depicting an exemplary apparatus 900 that may include a variety of optional hardware and software components. The illustrated apparatus 900 can include one or more controllers or processors 902 (e.g., signal processor, microprocessor, ASIC, or other control and processing logic circuitry) for performing such tasks as signal coding, data processing, input/output processing, power control, and/or other functions.

The illustrated apparatus 900 can also include a memory or memories 904. The memory 904 can include a non-removable memory and/or a removable memory. The non-removable memory can include RAM, ROM, flash memory, a hard disk, or other well-known memory storage technologies. The removable memory can include flash memory or other well-known memory storage technologies. The memory can be used for storing data and/or code for running an operating system and/or one or more applications.

The apparatus 900 may be configured to implement the various features, examples and embodiments illustrated, for example, in FIGS. 2-4, 4A-4C, 5A-5B, 6A-6N, 7A-7F and 8A-8C partially or completely. Further, the processor 902 and/or the memory 904 may constitute means for implementing the various features, examples and embodiments illustrated, for example, in FIGS. 2-4, 4A-4C, 5A-5B, 6A-6N, 7A-7F and 8A-8C partially or completely. The functionality described herein can be performed, at least in part, by one or more computer program product components such as software components. According to an example, the processor 902 may be configured by the program code which when executed performs the examples and embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (CPUs).

The embodiments and examples are described above by way of example only, and the hardware used to carry out these embodiments may vary in many ways, as persons skilled in the hardware and/or software art will appreciate. The functionality of one or more components of the example embodiments may be implemented for example by one or more apparatus and/or a computer program executed on a computer.

The example embodiments may store information related to the different processes described herein. This information may be stored in one or more memories, such as a hard disk, optical disk, RAM memory etc. One or more memories or databases may store the information used to carry out the example embodiments of the present invention.

The example embodiments as a whole or parts of them may be carried out using one or more general-purpose processors, microprocessors, DSP processors, microcontrollers etc., which are programmed according to the teachings of the example embodiments of the present invention, as persons skilled in the computer and/or software art will appreciate.

Any computer-readable medium or combination of media may store the computer program or computer program product for executing the processing to be executed to carry out the invention as a whole or in part (if the processing is distributed).

The devices for use in the embodiments of the invention may include computer-readable media or memories containing commands programmed according to the teachings of the present invention with data structures, tables, records and/or other data described herein. The computer readable-media may include any suitable medium participating in providing commands to the processor for their execution. Such a medium may be provided in many different forms, including non-volatile memories, volatile memories, transfer media, etc., without being limited to the afore-said. The non-volatile memories may include for example optical or magnetic disks, magneto-optical disks, etc. The volatile memories may include dynamic memories, etc. The transfer media may include coaxial cables, copper wire, optical fiber, etc. The transfer media may also be provided in the form of acoustic, optical, electromagnetic etc. waves, such as in the form of waves formed during radio-frequency communication, infrared data transfer, etc. General embodiments of computer-readable media may include for example a computer disk, hard disk, magnetic tape, any other suitable magnetic medium, CD-ROM disk, CD-R disk, CD-RW disk, DVD disk, DVD-ROM disk, DVD±RW disk, DVD±R disk, any other suitable optical medium, RAM memory, ROM memory, EPROM memory, FLASH-EPROM memory, any other suitable memory chip or any other suitable medium readable by a processor or a computer. The devices for use in the embodiments of the invention may also include data transfer means by which information is sent and received using a wired or wireless data transfer connection.

The invention is not limited merely to the above embodiment examples; instead, many modifications are possible within the scope of the inventive idea defined by the claims.

The invention claimed is:

1. A method comprising:
controlling a structural light source comprising a laser light source and a diffraction element of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model;
recording a first image of the surface comprising the diffraction pattern with a first camera of the modelling arrangement and a second image of the surface comprising the diffraction pattern with a second camera of the modelling arrangement substantially simultaneously, the first camera and the second camera being calibrated and their positions relative to each other being known;
determining a point cloud comprising primary points from the diffraction pattern visible in the first image, each primary point being accurately identifiable based on a single image and having accurate three-dimensional coordinates;
identifying the corresponding primary points from the second image;
using each primary point of the point cloud in the first and second images as an initial point for search spaces for secondary points that lie between the primary points in in the first and second images, the secondary points comprising noise and increasing the spatial resolution provided by the modelling arrangement
forming partial image pairs of the first and second images by dividing the first image and the second image to a set of partial images, each partial image pair comprising a partial image of the first image and a corresponding partial image of the second image, and wherein each partial image pair of the first image and the second image comprises a closed area defined by at least three primary points of the point cloud;
identifying corresponding secondary points within the closed area in the partial image pairs, each secondary point having x and y image coordinates;
calculating X, Y and Z coordinates in an external coordinate system for each secondary point based on the x and y image coordinates of the secondary point and the camera positions;
excluding the at least three primary points from the partial image pairs;
determining a first maximum intensity in the partial image of the first image and a second maximum intensity in the partial image of the second image from which the at least three primary points have been excluded;
normalizing an intensity of each pixel in the partial image of the first image based on the first maximum intensity; and
normalizing an intensity of each pixel in the partial image of the second image based on the second maximum intensity.

2. The method of claim 1, further comprising:
forming partial image pairs of the first and second images by dividing the first image and the second image to a set of partial images, each partial image pair comprising a partial image of the first image and a corresponding partial image of the second image, and wherein each partial image of the first image and the second image comprise the same single primary point of the point cloud;

identifying corresponding secondary points in the partial image pairs, each secondary point having x and y image coordinates; and calculating X, Y and Z coordinates in an external coordinate system for each secondary point based on the x and y image coordinates of the secondary point and the camera positions.

3. The method of claim 1, further comprising:
dividing each partial image into sub-blocks; and
identifying corresponding secondary points in the sub-blocks.

4. The method of claim 1, wherein identifying corresponding secondary points in the partial image pairs comprises:

searching a secondary point in the partial image of the second image, the secondary point corresponding to a secondary point in the corresponding partial image of the first image, in a search area along the corresponding epipolar line in the partial image of the second image having substantially the same distance along the epipolar line from the primary point in the partial image of the second image than a distance between the secondary point in the partial image of the first image and the primary point in the partial image of the first image.

5. A modelling system comprising:
a modelling arrangement comprising:
a structural light source comprising a laser light source and a diffraction element configured to produce a diffraction pattern of a known geometry on a surface to be modeled, the diffraction pattern accurately complying with a mathematical-physical model and wherein beam output angles of the diffraction pattern are accurately known based on the mathematical-physical model;
a first camera configured to photograph the surface to be modeled at wavelengths emitted by the light source; and
a second camera configured to photograph the surface to be modeled at wavelengths emitted by the light source,
wherein the modeling arrangement is calibrated so that relative orientations of the optical axis of the first camera and the second camera and the diffraction axis are known, and wherein the position, distance and orientation of the output point of the structural light source to the first camera and the second camera are known;
a control system connected to the modelling arrangement and being configured to:
control the structural light source to produce the diffraction pattern of a known geometry on the surface to be modeled;
record a first image of the surface comprising the diffraction pattern with the first camera and a second image of the surface comprising the diffraction pattern with the second camera substantially simultaneously;
determine a point cloud comprising primary points from the diffraction pattern visible in the first image, each primary point being accurately identifiable based on a single image and having accurate three-dimensional coordinates;
identify the corresponding primary points from the second image;
use each primary point of the point cloud in the first and second images as initial points for search spaces for secondary points that lie between the primary points in the first and second images, the secondary points comprising noise and increasing the spatial resolution provided by the modelling arrangement;
form partial image pairs of the first and second images by dividing the first image and the second image to a set of partial images, each partial image pair comprising a partial image of the first image and a corresponding partial image of the second image, and wherein each partial image pair of the first image and the second image comprises a closed area defined by at least three primary points of the point cloud;
identify corresponding secondary points within the closed area in the partial image pairs, each secondary point having x and y image coordinates;
calculate X, Y and Z coordinates in an external coordinate system for each secondary point based on the x and y image coordinates of the secondary point and the camera positions;
exclude the at least three primary points from the partial image pairs;
determine a first maximum intensity in the partial image of the first image and a second maximum intensity in the partial image of the second image from which the at least three primary points have been excluded;
normalize an intensity of each pixel in the partial image of the first image based on the first maximum intensity; and
normalize an intensity of each pixel in the partial image of the second image based on the second maximum intensity.

6. The modelling system of claim 5, wherein the control system connected to the modelling arrangement is further configured to:
form partial image pairs of the first and second images by dividing the first image and the second image to a set of partial images, each partial image pair comprising a partial image of the first image and a corresponding partial image of the second image, and wherein each partial image of the first image and the second image comprise the same single primary point of the point cloud;
identify corresponding secondary points in the partial image pairs, each secondary point having x and y image coordinates; and
calculate X, Y and Z coordinates in an external coordinate system for each secondary point based on the x and y image coordinates of the secondary point and the camera positions.

7. The modelling system of claim 6, wherein the control system is configured to:
divide each partial image into sub-blocks; and
identify corresponding secondary points in the sub-blocks.

8. The modelling system of claim 6, wherein the control system is configured to:
search a secondary point in the partial image of the second image, the secondary point corresponding to a secondary point in a corresponding partial image of the first image, in a search area along the corresponding epipolar line in the partial image of the second image having substantially the same distance along the epipolar line from the primary point in the partial image of the second image than a distance between the secondary point in the partial image of the first image and the primary point in the partial image of the first image.

9. An apparatus comprising:

means for controlling a structural light source comprising a laser light source and a diffraction element of a modelling arrangement to produce a diffraction pattern of a known geometry on a surface to be modeled, the diffraction pattern accurately complying with a mathematical-physical model and wherein beam output angles of the diffraction pattern are accurately known based on the mathematical-physical model;

means for causing recording of a first image of the surface comprising the diffraction pattern with a first camera of the modelling arrangement and a second image of the surface comprising the diffraction pattern with a second camera of the modelling arrangement substantially simultaneously, the first camera and the second camera being calibrated and their positions relative to each other being known;

means for determining a point cloud comprising primary points from the diffraction pattern visible in the first image, each primary point being accurately identifiable based on a single image and having accurate three-dimensional coordinates;

means for identifying the corresponding primary points from the second image;

means for using each primary point of the point cloud in the first and second images as an initial point for search spaces for secondary points that lie between the primary points in the first and second images, the secondary points comprising noise and increasing the spatial resolution provided by the modelling arrangement;

means for forming partial image pairs of the first and second images by dividing the first image and the second image to a set of partial images, each partial image pair comprising a partial image of the first image and a corresponding partial image of the second image, and wherein each partial image pair of the first image and the second image comprises a closed area defined by at least three primary points of the point cloud;

means for identifying corresponding secondary points within the closed area in in the partial image pairs, each secondary point having x and y image coordinates;

means for calculating X, Y and Z coordinates in an external coordinate system for each secondary point based on the x and y image coordinates of the secondary point and the camera positions;

means for excluding the at least three primary points from the partial image pairs;

means for determining a first maximum intensity in the partial image of the first image and a second maximum intensity in the partial image of the second image from which the at least three primary points have been excluded;

means for normalizing an intensity of each pixel in the partial image of the first image based on the first maximum intensity; and means for normalizing an intensity of each pixel in the partial image of the second image based on the second maximum intensity.

10. The apparatus of claim 9, further comprising:

means for forming partial image pairs of the first and second images by dividing the first image and the second image to a set of partial images, each partial image pair comprising a partial image of the first image and a corresponding partial image of the second image, and wherein each partial image of the first image and the second image comprise the same single primary point of the point cloud;

means for identifying corresponding secondary points in the partial image pairs, each secondary point having x and y image coordinates; and means for calculating X, Y and Z coordinates in an external coordinate system for each secondary point based on the x and y image coordinates of the secondary point and the camera positions.

11. The apparatus of claim 9, further comprising:

means for dividing each partial image into sub-blocks; and means for identifying corresponding secondary points in the sub-blocks.

12. The apparatus of claim 9, further comprising:

means for searching a secondary point in the partial image of the second image, the secondary point corresponding to a secondary point in the corresponding partial image of the first image, in a search area along the corresponding epipolar line in the partial image of the second image having substantially the same distance along the epipolar line from the primary point in the partial image of the second image than a distance between the secondary point in the partial image of the first image and the primary point in the partial image of the first image.

13. A computer program comprising program code arranged to perform the method according to claim 1, when the program code is executed by at least one processor.

14. A computer-readable medium comprising a computer program comprising program code arranged to perform the method according to claim 1, when the program code is executed by at least one processor.

* * * * *